United States Patent
Lei et al.

(10) Patent No.: US 12,389,451 B2
(45) Date of Patent: Aug. 12, 2025

(54) PDCCH TRANSMISSION IN UE-INITIATED COT

(71) Applicant: Lenovo (Beijing) Limited, Beijing (CN)

(72) Inventors: Haipeng Lei, Haidian District (CN); Alexander Golitschek Edler von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 678 days.

(21) Appl. No.: 17/634,032

(22) PCT Filed: Aug. 27, 2019

(86) PCT No.: PCT/CN2019/102674
§ 371 (c)(1),
(2) Date: Feb. 9, 2022

(87) PCT Pub. No.: WO2021/035502
PCT Pub. Date: Mar. 4, 2021

(65) Prior Publication Data
US 2022/0295558 A1  Sep. 15, 2022

(51) Int. Cl.
*H04W 4/00* (2018.01)
*H04W 24/08* (2009.01)
(Continued)

(52) U.S. Cl.
CPC ....... *H04W 74/0816* (2013.01); *H04W 24/08* (2013.01); *H04W 72/0453* (2013.01); *H04W 74/004* (2013.01); *H04W 74/0866* (2013.01)

(58) Field of Classification Search
CPC ............. H04W 74/0816; H04W 24/08; H04W 72/0453; H04W 74/004; H04W 74/0866;
(Continued)

(56) References Cited

U.S. PATENT DOCUMENTS 10,749,640 B2 * 8/2020 Kim ...................... H04L 5/0055
11,206,642 B2 * 12/2021 Mukherjee ............ H04L 1/1671
(Continued)

FOREIGN PATENT DOCUMENTS

| EP | 3352522 A1 | 7/2018 |
| WO | 2019029640 A1 | 2/2019 |

OTHER PUBLICATIONS

"International Preliminary Report on Patentability", PCT Application No. PCT/CN2019/102674, Mar. 10, 2022, 5 pages.
(Continued)

*Primary Examiner* — Amancio Gonzalez
(74) *Attorney, Agent, or Firm* — FIG. 1 Patents

(57) ABSTRACT

Methods, a remote unit and a base unit are disclosed. According to one embodiment, a method at a remote nit, comprising: receiving, from a base unit, a first signaling for configuring a plurality of subbands for transmitting uplink data; performing a first channel access procedure on each of the plurality of subbands and obtaining a channel occupancy time (COT) on a first set of subbands, wherein the first set of subbands comprises one or more subbands of the plurality of subbands with the first channel access procedures being successful; and transmitting, to the base unit, the uplink data on the first set of subbands within the COT; and transmitting, to the base unit, uplink control information (UCI) associated to the uplink data, wherein the UCI includes a first indicator indicating the first set of subbands.

20 Claims, 13 Drawing Sheets

(51) Int. Cl.
*H04W 72/0453* (2023.01)
*H04W 74/00* (2009.01)
*H04W 74/08* (2009.01)
*H04W 74/0816* (2024.01)

(58) Field of Classification Search
CPC ............... H04W 72/20; H04W 74/002; H04W 72/1268; H04W 74/0808; H04L 5/0023; H04L 5/001; H04L 5/0053; H04L 5/0091
USPC .......................................................... 370/329
See application file for complete search history.

(56) References Cited

U.S. PATENT DOCUMENTS

| | | | |
|---|---|---|---|
| 11,272,538 B2* | 3/2022 | Zhao | H04L 25/0226 |
| 11,337,188 B2* | 5/2022 | Oh | H04W 4/70 |
| 11,350,452 B2* | 5/2022 | Sun | H04L 27/2601 |
| 11,399,393 B2* | 7/2022 | Jeon | H04W 74/0808 |
| 11,445,542 B2* | 9/2022 | Park | H04W 74/004 |
| 11,540,254 B2* | 12/2022 | Bang | H04W 72/0446 |
| 11,546,121 B2* | 1/2023 | Kim | H04L 5/0098 |
| 11,595,098 B2* | 2/2023 | Wernersson | H04B 7/0634 |
| 11,737,134 B2* | 8/2023 | Wang | H04L 1/1854 370/329 |
| 11,743,904 B2* | 8/2023 | Cirik | H04L 5/0098 370/329 |
| 11,770,718 B2* | 9/2023 | Zhou | H04W 72/21 370/329 |
| 11,956,822 B2* | 4/2024 | Deenoo | H04W 74/0816 |
| 12,052,760 B2* | 7/2024 | Jeon | H04W 74/0833 |
| 12,058,733 B2* | 8/2024 | Wang | H04W 16/14 |
| 2019/0253200 A1 | 8/2019 | Salem et al. | |
| 2020/0305182 A1* | 9/2020 | Zhou | H04W 72/04 |
| 2021/0144739 A1* | 5/2021 | Jiang | H04L 27/2613 |
| 2021/0235496 A1* | 7/2021 | Park | H04B 1/715 |
| 2022/0046722 A1* | 2/2022 | Kim | H04L 5/0048 |
| 2022/0078834 A1* | 3/2022 | Wu | H04L 5/0053 |
| 2022/0131725 A1* | 4/2022 | Li | H04L 5/0048 |
| 2022/0150917 A1* | 5/2022 | Wang | H04W 16/14 |
| 2022/0183060 A1* | 6/2022 | Li | H04W 72/0453 |
| 2022/0295560 A1* | 9/2022 | Shokri Razaghi | H04W 72/23 |

OTHER PUBLICATIONS

"International Search Report and Written Opinion", PCT Application No. PCT/CN2019/102674, May 26, 2020, 7 pages.

Huawei, et al., "Transmission with configured grant in NR unlicensed band", 3GPP TSG RAN WG1 Meeting #96bis, R1-1903931, Xi'an, China, Apr. 2019, 19 pages.

Intel Corporation, "Wideband operation for NR-unlicensed", 3GPP TSG RAN WG1 Meeting #96bis, R1-1904289, Xi'an, China, Apr. 2019, 6 pages.

Nokia, et al., "On support of UL transmission with configured grants in NR-U", 3GPP TSG RAN WG1 Meeting #97, R1-1906645, Reno, NV, US, May 2019, 11 pages.

Nokia, et al., "On wideband operation in NR-U", 3GPP TSG RAN WG1 Meeting #96bis, R1-1904194, Xi'an, China, Apr. 2019, 15 pages.

Sony, "Enhancements to Configured Grants in NR-U", 3GPP TSG RAN WG1 meeting #97, R1-1907193, Reno, NV, USA, May 2019, 6 pages.

* cited by examiner

PDCCH TRANSMISSION IN UE-INITIATED COT

FIELD

The subject matter disclosed herein generally relates to wireless communications and, more particularly, to PDCCH transmission in UE-initiated channel occupancy time (COT).

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), Very Large Scale Integration (VLSI), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Downlink (DL), Uplink (UL), Evolved Node B (eNB), Next Generation Node B (gNB), New Radio (NR), NR-unlicensed (NR-U), Multiple-Input Multiple-Output (MIMO), Multiple User MIMO (MU-MIMO), Frequency Range 1 (FR1), Frequency Range 2 (FR2), Physical Uplink Shared Channel (PUSCH), Physical Uplink Control Channel (PUCCH), Physical Downlink Control Channel (PDCCH), Channel Occupancy Time (COT), Group Common-PDCCH (GC-PDCCH), Physical Downlink Share Channel (PDSCH), Downlink Control Information (DCI), Resource Block (RB), Physical RB (PRB), Resource Element (RE), RE Group (REG), Control Channel Element (CCE), Control Resource Set (CORE-SET), Bandwidth Part (BWP), Hybrid Automatic Repeat Request Acknowledgement (HARQ-ACK), Positive Acknowledgement (ACK), Negative Acknowledgement (NACK), Radio Resource Control (RRC), New Data Indicator (NDI), Configured Grant (CG), Downlink Feedback Information (DFI), Listen-before-Talk (LBT), Identification (ID), Carrier Indicator Field (CIF), Autonomous Uplink (AUL), Transmission Power Control (TPC), Radio Network Temporary Identifier (RNTI), Cell-RNTI (C-RNTI), Configured Scheduling RNTI (CS-RNTI), Transmitted Precoding Matrix Indicator (TPMI), Transmission Mode (TM), Redundancy Version (RV), Transmit and Receive Point (TRP), Channel State Information (CSI), Demodulation Reference Signal (DMRS), Network (NW), Component Carrier (CC), Media Access Control (MAC), Control Element (CE), Layer 1 (L1), Primary Cell (PCell), Secondary Cell (SCell), Licensed Assisted Access (LAA), Radio Access Technology (RAT), Cyclic Redundancy Check (CRC), Wireless Fidelity (WiFi), Search Space (SS), Clear Channel Assessment (CCA), Information Element (IE), System Information Block (SIB), Synchronization Signal Block (SSB), Modulation and Coding Scheme (MCS).

LAA is a 3GPP enhancement of LTE to allow cellular network operators to offload some of the data traffic by accessing the unlicensed 5 GHz frequency band, which has been standardized in LTE Release 13.

LTE-LAA allows operators to transmit in the unlicensed spectrum using a secondary cell, alongside a primary cell operating in the licensed band. The frequency band of most interest for LTE-LAA is the 5 GHz band.

Given the widespread deployment and usage of other technologies in unlicensed spectrum, it is necessary that LAA coexists with existing and future technologies targeted for unlicensed spectrum. To ensure co-existence of LAA and other RAT in the unlicensed spectrum, LAA needs to use a fair and efficient LBT scheme. LBT is a contention-based protocol that allows many users to use the same radio channel without prior coordination.

3GPP Release 13 defines LAA only for the DL. 3GPP Release 14 defines enhanced-LAA (eLAA), which includes UL operation in the unlicensed channel. The technology continued to be developed in 3GPP Release 15 under the title Further Enhanced LAA (FeLAA). LAA NR-U extends the success of LAA from LTE to 5G NR.

This invention relates to 3GPP 5G NR access on unlicensed spectrum, especially for UL transmission and DL monitoring on unlicensed spectrum. This disclosure tried to address, among other things, some issue associated with PDCCH monitoring in the shared DL slots within a UE-initiated COT.

SUMMARY

Methods and apparatuses for performing a PDCCH transmission in a COT initiated by a remote unit are disclosed.

In one embodiment, a method at a remote unit and a remote to perform the method are disclosed. The method comprises: receiving, from a base unit, a first signaling for configuring a plurality of subbands for transmitting uplink data; performing a first channel access procedure on each of the plurality of subbands and obtaining a channel occupancy time (COT) on a first set of subbands, wherein the first set of subbands comprises one or more subbands of the plurality of subbands with the first channel access procedures being successful; transmitting, to the base unit, the uplink data on the first set of subbands within the COT; and transmitting, to the base unit, uplink control information (UCI) associated to the uplink data, wherein the UCI includes a first indicator indicating the first set of subbands.

Preferably, the method further comprises: monitoring downlink control channel transmission from the base unit in one or more slots, wherein the one or more slots are within the COT and shared for the base unit for downlink transmission.

Preferably, the method further comprises: receiving, from the base unit, a second signaling for configuring multiple control resource sets for the remote unit to monitor downlink control channel transmission from the base unit; wherein the UCI further includes a second indicator indicating one or more control resource sets of the multiple control resource sets where the remote unit attempts to monitor the downlink control channel transmission in one or more slots within the COT, wherein the one or more slots are shared for the base unit for downlink transmission; and monitoring the downlink control channel transmission within the one or more control resource sets in the one or more slots.

Preferably, the method further comprises: in response to the downlink control channel transmission is not detected in one monitoring occasion of the one or more slots, monitoring the downlink control channel transmission in next monitoring occasion of the one or more slots.

In another embodiment, a method at a base unit and a base unit to perform the method are disclosed. The method comprises: transmitting, to a remote unit, a first signaling for configuring a plurality of subbands for transmitting uplink data; receiving, from the remote unit, UCI associated to the uplink data, wherein the UCI includes a first indicator indicating a first set of subbands, wherein the first set of subbands comprises one or more subbands of the plurality of subbands; and receiving, from the remote unit, the uplink data on the first set of subbands within a COT obtained by the remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not, therefore, to be considered to be limiting in scope, the embodiments will be described and explained with additional specificity and detail through the use of the accompanying drawings, in which.

DETAILED DESCRIPTION

Figure 1:
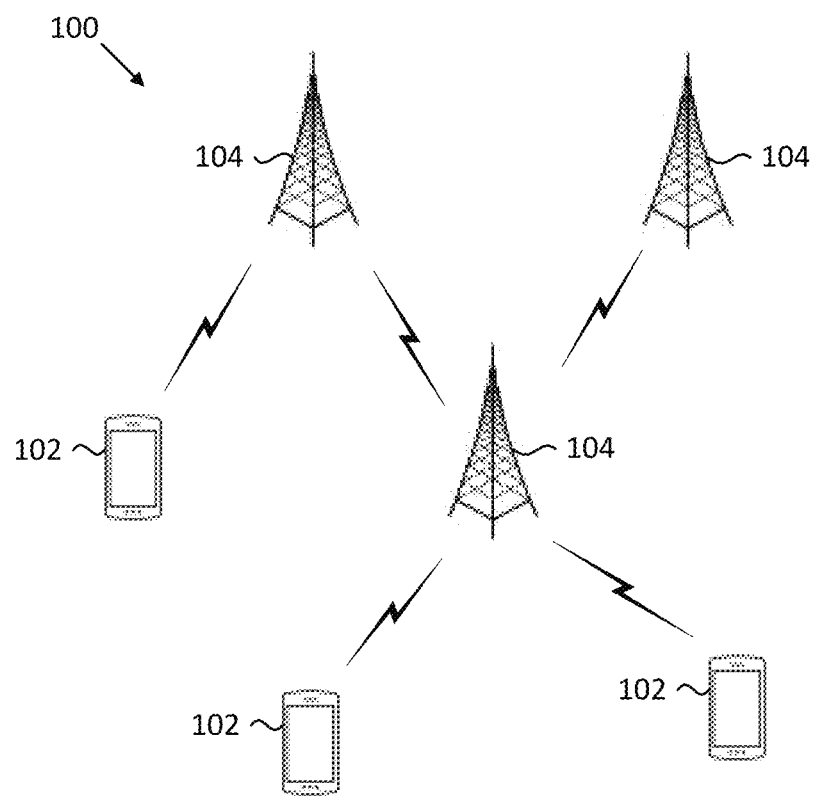
FIG. 1 is a schematic block diagram illustrating one embodiment of a wireless communication system for PDCCH transmission and reception in UE-initiated COT.

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, may be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that may direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

FIG. 1 depicts an embodiment of a wireless communication system 100. The wireless communication system 100 can support a PDCCH transmission and reception within a UE-initiated COT. In one embodiment, the wireless communication system 100 includes remote units 102 and base units 104. Even though a specific number of the remote units 102 and the base units 104 are depicted in FIG. 1, it should be noted that any number of the remote units 102 and the base units 104 may be included in the wireless communication system 100.

In one embodiment, the remote units 102 may include computing devices, such as desktop computers, laptop computers, personal digital assistants ("PDAs"), tablet computers, smartphones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smartwatches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G NR. More generally, however, the wireless communication system 100 may implement some other open or proprietary communication protocol, for example, WiMAX, among other protocols.

The base units 104 may serve a number of the remote units 102 within a serving area, for example, a cell or a cell sector via a wireless communication link. The base units 104 transmit DL communication signals to serve the remote units 102 in the time, frequency, and/or spatial domain.

Figure 2:
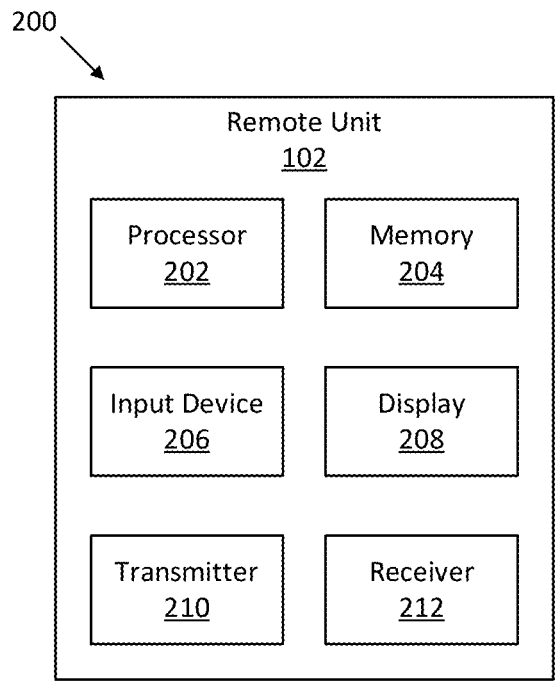
FIG. 2 is a schematic block diagram illustrating one embodiment of an apparatus that may be used to receive a PDCCH transmission within a UE-initiated COT.

FIG. 2 depicts one embodiment of an apparatus 200 that may be used to receive a PDCCH transmission within a UE-initiated COT. The apparatus 200, in one embodiment, includes a remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smartwatch, smart glasses, a heads-up display, or the like. Further, the display 208 may be a component of a smartphone, a personal digital assistant, a television, a tablet computer, a notebook (laptop) computer, a personal computer, a vehicle dashboard, or the like.

In certain embodiments, the display 208 includes one or more speakers for producing sound. For example, the display 208 may produce an audible alert or a notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and the display 208 may form a touchscreen or a similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
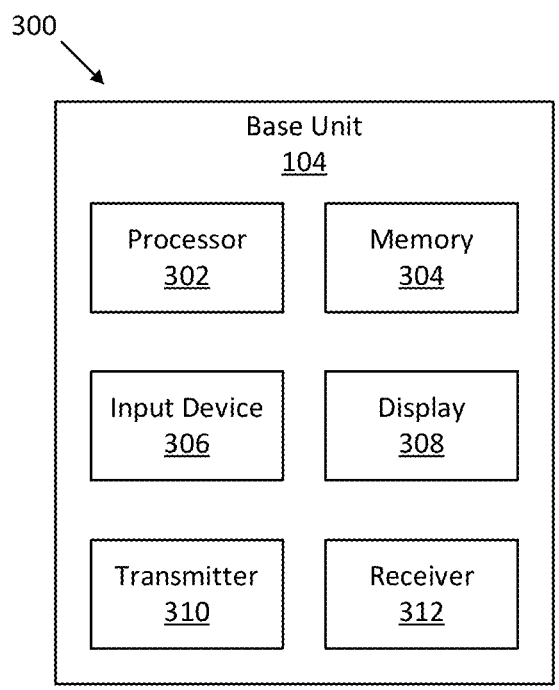
FIG. 3 is a schematic block diagram illustrating one embodiment of an apparatus that may be used for a PDCCH transmission within a UE-initiated COT.

FIG. 3 depicts one embodiment of an apparatus 300 that may be used for a PDCCH transmission within a UE-initiated COT. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
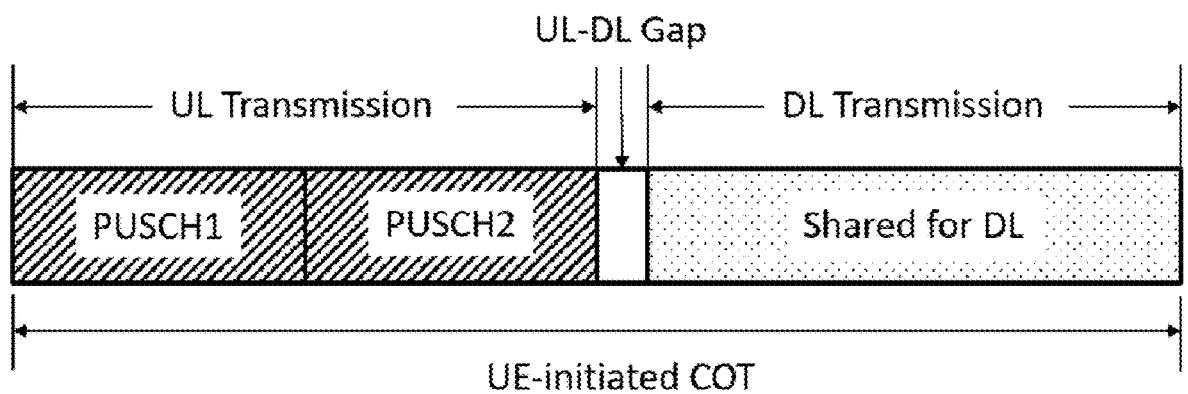
FIG. 4 is a schematic illustrating an example of a UE-initiated COT being used for both uplink and downlink transmission.

FIG. 4 is a schematic illustrating an example of a UE-initiated COT being used for both uplink and downlink transmission.

In the LTE Release 15 FeLAA, an Autonomous Uplink (AUL) transmission is supported for the unlicensed spectrum. UE may initiate a channel occupancy time (COT) for AUL transmission by performing a channel access procedure on the unlicensed spectrum. The COT consists of one or more subframes. The length of subframe is 1 ms. The number of slots included in each subframe depends on the subcarrier spacing. Each slot consists of 14 OFDM symbols. UE may transmit PUSCH transmissions in the COT. In the LTE Release 15 FeLAA, UE can transmit each PUSCH transmission in only one subframe. Associated UCIs are carried in the PUSCH transmissions, respectively. On the configured resource for AUL transmission, UE may share part of its initiated COT with eNB for DL transmission. For example, as shown in FIG. 4, during the UE-initiated COT, 2 PUSCH transmissions, labeled as PUSCH1 and PUSCH2, are transmitted to eNB. Since the COT is not exhausted after the PUSCH transmissions, the remaining resources assigned to the COT may subsequently be shared with eNB to support downlink transmission. Thus, a UL-DL gap is needed as a transition period to allow for switching from the uplink transmission by a UE to a downlink transmission by the eNB.

In the shared subframe(s), specifically, in the part of COT used for transmitting the downlink transmission by the eNB, the first two OFDM symbols may be used by eNB to transmit an autonomous uplink transmission-downlink feedback information (AUL-DFI) or UL grant to the UE. This AUL-DFI may include CIF, AUL DFI flag, HARQ-ACK feedback, TPC for PUSCH, TPMI, etc.

To enable the eNB to use the UE-initiated COT, one-bit COT sharing indication is transmitted by the UE in an autonomous uplink-uplink control information (AUL-UCI) associated with AUL PUSCH transmission, for example, PUSCH1 and PUSCH2 as shown in FIG. 4.

The COT sharing indication indicates whether the UE allows eNB to share the UE-initiated COT. If the one-bit COT sharing indication in the AUL-UCI is transmitted in uplink subframe n within the UE-initiated COT, indicating that the UE-initiated COT is allowed to be shared with eNB, subframe n+X within the UE-initiated COT is allocated to eNB for DL transmission, where X is configured by the eNB. The range of X may be, for example, 1<X<5 subframes.

In LTE Release 15 FeLAA, if COT sharing has been indicated to an eNB with the COT sharing indication in the AUL-UCI, the eNB may transmit a downlink transmission including PDCCH but not including PDSCH on the same carrier for transmitting the AUL-UCI immediately after sensing the channel to be idle for at least a sensing interval $T_{pdcch}$=25 us. If the duration of the PDCCH transmission to be transmitted is less than or equal to two OFDM symbols length, the PDCCH transmission shall contain at least an AUL-DFI or UL grant to the UE related to the received PUSCH transmission that indicated the COT sharing indication. $T_{pdcch}$ consists of a duration $T_f$=16 us immediately followed by one slot duration $T_{sl}$=9 us. There is an idle slot duration $T_{sl}$ at the start of $T_f$. The channel is considered to be idle for a duration of $T_{pdcch}$ if it is sensed to be idle during the idle slot duration $T_{sl}$ within the $T_{pdcch}$.

In a UE-initiated COT, the maximum number of slots which can be shared to eNB is dependent on the duration of the maximum COT that can be initiated by UE. In the presence of other RATs, the duration of the maximum COT is less to avoid interference with the other RATs. For example, if it is uncertain whether another RAT (e.g., WiFi) exists on a same carrier, the maximum COT initiated by UE may be 6 ms. Here, the duration of a slot is dependent on subcarrier spacing. For example, the duration for a slot is 1 ms in case of 15 kHz subcarrier spacing. Therefore, the maximum number of slots included in the maximum COT may be 6 for 15 kHz subcarrier spacing, 12 for 30 kHz subcarrier spacing, 24 for 60 kHz subcarrier spacing and 48 for 120 kHz subcarrier spacing. As a result, since at least one slot is used for transmitting UCI for COT sharing indication, the maximum number of slots can be shared to eNB may be 5 for 15 kHz subcarrier spacing, 11 for 30 kHz subcarrier spacing, 23 for 60 kHz subcarrier spacing and 47 for 120 kHz subcarrier spacing. In contrast, if it can be determined that another RAT (e.g., WiFi) does not exist on the same carrier, the maximum COT initiated by UE may be longer, for example, 10 ms. The maximum number of slots included in the COT may be 10 for 15 kHz subcarrier spacing, 20 for 30 kHz subcarrier spacing, 40 for 60 kHz subcarrier spacing and 80 for 120 kHz subcarrier spacing. Therefore, the maximum number of slots can be shared with eNB may be 9 for 15 kHz subcarrier spacing, 19 for 30 kHz subcarrier spacing, 39 for 60 kHz subcarrier spacing and 79 for 120 kHz subcarrier spacing.

In LTE Release 15 FeLAA, if the UE detects a DL transmission of downlink control information (DCI), Format 0A/4A, carrying AUL-DFI, the UE may handle the autonomous uplink feedback information carried in the AUL-DFI in the following ways: for each HARQ process configured for autonomous uplink transmission, the corresponding HARQ-ACK feedback is delivered to higher layers (e.g., MAC layer); for the HARQ processes not configured for autonomous uplink transmission, the corresponding HARQ-ACK feedback is not delivered to higher layers. For an uplink transmission in subframe n within the UE-initiated COT, the UE expects corresponding HARQ-ACK feedback in the AUL-DFI at the earliest in subframe n+4 within the UE-initiated COT. If the UE receives an AUL-DFI in a subframe within the UE-initiated COT indicating an ACK for a HARQ process, the UE does not expect to receive an AUL-DFI indicating the ACK for the same HARQ process in 4 ms after the UE transmits another uplink transmission associated with that HARQ process.

In Release 16 NR-U, UE-initiated COT for a UL transmission with a configured grant may be shared with gNB for DL transmission. When a UE initiates a COT for an UL transmission using a configured grant, the duration that the gNB is allowed to transmit in the UE-initiated COT may be signaled by the UE to the gNB in a configured grant-uplink control information (CG-UCI) message. The CG-UCI message should at least include HARQ ID, NDI, RV, and COT sharing information.

In the NR uplink, an UL transmission without a dynamic UL grant, which may be referred to as a configured grant transmission, is supported. There are two schemes for configured grant transmission: configured grant type 1, where an uplink grant is provided by a radio resource control (RRC) signaling from a gNB, indication in a DCI for the activation of the configured grant is included in the RRC signaling; and configured grant type 2, where the uplink transmission periodicity is provided by a RRC signaling from a gNB, and activation/deactivation, as well as necessary information for transmission, is provided by an L1 control signaling. Since there is no need to transmit a scheduling request to the gNB and receive an UL grant prior to UL data transmission, the configured grant transmission may reduce control signaling overhead and reduce latency. In configured grant type 1, all of the transmission parameters, including periodicity, time offset, and frequency resources, as well as modulation and coding scheme (MCS), are configured by a gNB via a RRC signaling. Configured grant type 2 is similar to LTE AUL transmission, that is, RRC signaling is used to configure the time domain resource allocation, while a DCI for activation of the configured grant provides frequency domain resource and other necessary transmission parameters.

In a NR-U standard, an unlicensed spectrum at 5.7 GHz with wide bandwidth is used. The NR-U standard operating bandwidth is defined as an integer multiple of, for example, of 20 MHz with the bandwidth larger than 20 MHz (e.g., 40, 60, 80, 100 MHz) being divided into 20 MHz-subbands. For the purpose of fair coexistence with other RATs, listen-before-talk (LBT) needs to be performed on each subband before transmission.

Figure 5:
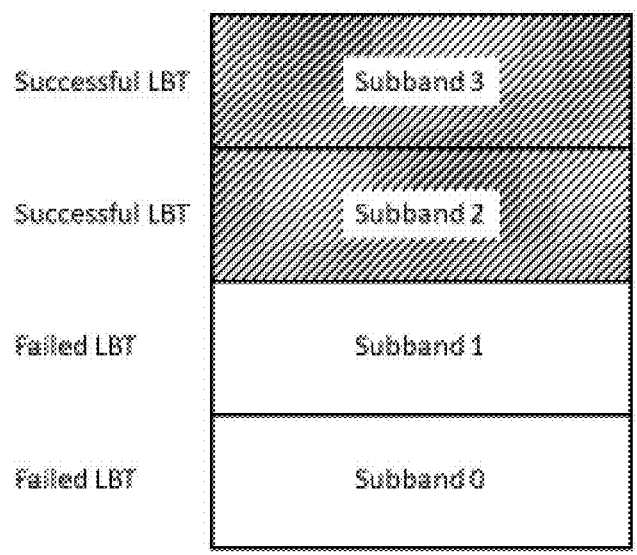
FIG. 5 is a schematic illustrating an example of a plurality of subbands and LBT for each subband.

FIG. 5 is a schematic illustrating an example of a plurality of subbands and an outcome of a LBT procedure for each subband.

For transmission on an unlicensed spectrum, in order to achieve a fair coexistence with other wireless systems, channel access procedures, e.g., an LBT procedure is required before initiating any transmission on the unlicensed spectrum. One exemplary scheme used by the LBT procedure is based on the energy detection. For example, if a power of the received signal on a certain channel is determine to be less than a predefined threshold, the LBT procedure is successful for the corresponding channel, which means the channel is deemed to be clear and available for a subsequent transmission. In contrast, if the power of the received signal on a certain channel is above the predefined threshold, the LBT procedure indicates a failure for the corresponding channel, which means the channel is occupied by other nodes or other wireless systems and is not available for transmission. Only when the LBT procedure indicates success after measuring a certain channel, a transmission node may occupy such channel for a COT. And the UE can start to transmit uplink data until a maximum channel occupancy time (MCOT) has being reached. Otherwise, the transmission node may not start its transmission and needs to continue to perform the LBT procedure until a successful result is achieved.

In order to perform a downlink transmission, gNB performs an LBT procedure on each subband and aggregates all available subbands for perform a single PDSCH transmission. When a PDSCH transmission is scheduled on multiple subbands, if the LBT procedure for at least one of these subbands is successful, the gNB may initiate the PDSCH transmission on those subbands for which the LBT procedure has returned a successful result and puncture the PDSCH data for the subbands for which the LBT procedure has indicated a failure. As shown in FIG. 5, the downlink bandwidth is divided into 4 subbands, labeled as subband 0, subband 1, subband 2 and subband 3. Data associated with PDSCH transmission is scheduled to be transmitted by gNb all of the 4 subbands. Before a corresponding PDSCH transmission can begin, the gNB performs the LBT procedure on each of the 4 subbands. In the example shown in FIG. 5, the LBT procedure performed on subbands 2 and 3 returned a successful result, and therefore, the part of the PDSCH data scheduled for transmission on the subbands 2 and 3 can be transmitted, while the remaining part of the PDSCH data scheduled for transmission on the subbands 0 and 1 is punctured.

Similar to the downlink transmission, in order to perform an uplink transmission, UE performs an LBT procedure per subband and aggregates available subbands, e.g. those subbands for which the performed LBT procedure returned a successful result, to transmit a single PUSCH transmission. When the PUSCH is scheduled on multiple subbands, if the LBT procedure for some of the multiple subbands is successful, i.e. returns a successful result, the UE may initiate a PUSCH transmission on those subbands and puncture the PUSCH on the subbands for which the LBT procedure has returned a failure. The example illustrated in FIG. 5 may also be applied to uplink transmission situation.

Figure 6:
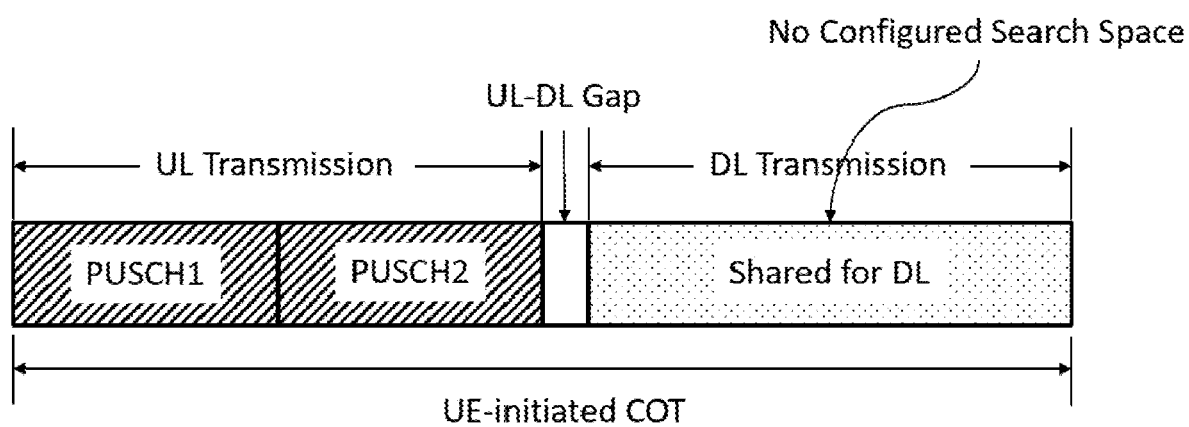
FIG. 6 is a schematic illustrating an example of UE-initiated COT shared to gNB for downlink transmission.
Figure 7:
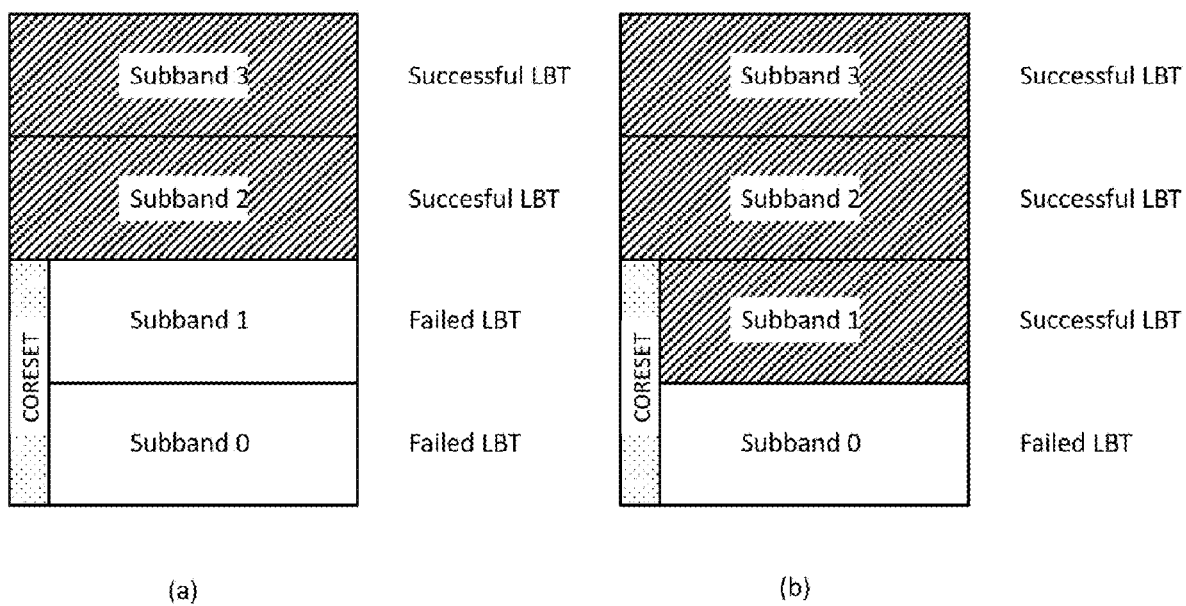
FIGS. 7(a) and (b) are schematics illustrating another example of UE-initiated COT shared to gNB for downlink transmission.

FIG. 6 and FIG. 7 will be referred to when describing problems that may occur during a PDCCH transmission during a UE-initiated COT.

FIG. 6 is a schematic illustrating an example of UE-initiated COT shared with gNB for downlink transmission.

As shown in FIG. 6, in a UE-initiated COT, UE transmits data associated with PUSCH channels (e.g., PUSCH1 and PUSCH2) to a gNB. In NR, UE can transmit each PUSCH transmission in only one slot. If the COT is not exhausted for an uplink transmission, the UE may share the remaining resources assigned to the COT with the gNB for both PDCCH and PDSCH transmissions. In this situation, an UL-DL gap is needed as a transition period to allow for switching from the uplink transmission by the UE to a subsequent downlink transmission by the gNB.

In NR, for a UE to receive a PDCCH transmission, CORESET and associated search space for detecting a PDCCH transmission are configured to the UE via a RRC signaling.

PDCCH search space refers to the area in the downlink resource grid where PDCCH transmission may be carried. The UE expecting to receive a PDCCH transmission performs a blind decoding throughout these search spaces trying to identify a PDCCH transmission (i.e., DCI). A logical resource unit of a PDCCH is a control channel element (CCE). The PDCCH consists of n consecutive CCEs, where n is called an aggregation level. A number of PDCCH transmission candidates, which is the number of CCE indexes searched by a UE in a subframe for a particular search space, is dependent on the aggregation level. PDCCH monitoring occasions which are the time domain location for the UE to monitor PDCCH transmissions in search space are configured by a gNB to a UE via higher layer signaling.

In the LTE system, the PDCCH transmission may occupy the entire frequency band in the frequency domain and may occupy the first 1-3 OFDM symbols of each subframe in the time domain. That is to say, the system only needs to inform the UE of the number of OFDM symbols occupied by PDCCH, then the UE can determine the search space for the PDCCH transmission.

In the NR system, since the bandwidth of the system is large, if the PDCCH transmission still occupies the entire bandwidth, resources are wasted and the complexity of blind detection will be large. In addition, the starting position of the PDCCH transmission in the time domain is also configurable to increase system flexibility. Therefore, in the NR system, the UE needs to know the location in the frequency domain and the location in the time domain to monitor PDCCH transmission. In this case, control resource set (CORESET) is introduced. CORESET is a set consisted of resource blocks (RBs) in the frequency domain and symbols in the time domain. Here, RB consists of 12 consecutive subcarriers in frequency domain. The smallest resource unit in CORESET is a resource element (RE) made up of one subcarrier in frequency domain and one OFDM symbol in time domain. REs in CORESET are organized in RE groups (REGs). The REG is made up of 12 REs. The CCE to REG mapping for CORESET may be interleaved or non-interleaved. The resources identified by the CORESET are used to transmit a DCI on PDCCH. Frequency allocation in CORESET can be contiguous or non-contiguous. In the time domain, CORESET may span 1 to 3 consecutive OFDM symbols. The frequency resource of the CORESET can occupy one or more RB groups and the RB groups can be contiguous or non-contiguous in the frequency domain. Each RB group comprises 6 contiguous RBs.

After performing an LBT procedure, e.g. LBT Category 4 (i.e. LBT with random backoff and a variable contention window size) or Type 1 channel access procedure (i.e. contention-based channel access procedure), UE initiates a COT and shares one or more slots within the COT with gNB for DL transmission. The UE detects the PDCCH based on CORESET and search space (SS). However, there may be no common search space or UE-specific search space configured for one or more slots shared with gNB as shown in FIG. 6. As a result, the UE does not detect the PDCCH transmission in the shared slots within the UE-initiated COT. If so, a configured grant-downlink feedback information (CG-DFI) carrying HARQ-ACK feedback for the UL HARQ processes cannot be transmitted to the UE. Moreover, the DL grant scheduling PDSCH transmission or the UL grant scheduling PUSCH transmission cannot be transmitted to the UE. That is, the UE shares one or more slots within a COT to gNB for downlink transmission but cannot receive the downlink transmission from the gNB.

FIGS. 7(*a*) and (*b*) are schematics illustrating another example of UE-initiated COT shared with gNB for downlink transmission.

As shown in FIG. 7(*a*) and FIG. 7(*b*), the wide bandwidth is divided into 4 subbands: a subband 0, a subband 1, a subband 2 and a subband 3, with a CORESET being configured to span multiple subbands. In the example shown in FIG. 7, the CORESET is configured on the subband 0 and the subband 1. After performing an LBT procedure on each subband, a UE initiates a COT and shares one or more slots with a gNB for a DL transmission. However, there may be no configured frequency resource of the CORESET in the subbands for which the LBT procedure was successful. As shown in FIG. 7(*a*), among the subbands 0-3, the LBT procedure resulted in a successful output on the subbands 2 and 3, and failed on the subbands 0 and 1. Since the CORESET is configured across subbands 0 and 1, there is no CORESET configured for the subbands with successful LBT results. Or, only part of the configured frequency resource of the CORESET may be within the subband with successful LBT results. As shown in FIG. 7(*b*), among the subbands 0-3, the LBT procedure was successful on the subbands 1-3 and failed on the subband 0. Since a CORESET is configured across the subbands 0 and 1, only subband 1 is configured with CORESET while the LBT procedure for this subband is successful. For the example shown in FIG. 7(*a*), there is no CORESET configured in the frequency resource occupied by the UE, i.e., subband 2 and subband 3. In this case, the UE does not detect the PDCCH transmission in the slots shared with the gNB within the UE-initiated COT even there is common search space or UE-specific search space.

On the other hand, even though the LBT procedure is successful at UE, the gNB is also required to perform a short LBT before the downlink transmission in the shared slots within the UE-initiated COT. The short LBT performed by the gNB may be unsuccessful due to a transmission node that is hidden from the UE. In this case, downlink transmission cannot be transmitted to the UE in the shared slots. That is, the UE shares one or more slots within a COT with the gNB for downlink transmission but cannot receive the downlink transmission from the gNB.

Therefore, to transmit PDCCH by a gNB and subsequently receive PDCCH by a UE in the shared UE-initiated COT, CORESETs and search spaces need to be configured appropriately.

In this invention, methods and apparatuses are proposed for PDCCH data (including CG-DFI, UL grant, DL grant, etc.) transmission and reception within the shared UE-initiated COT. Especially, CORESETs configuration and search spaces configuration for PDCCH transmission are described.

Proposals will be described with reference to FIGS. 8-12.

FIGS. 8-11 illustrate schematics that show CORESETs and subbands configuration on a wideband according to embodiments of the invention.

Figure 12:
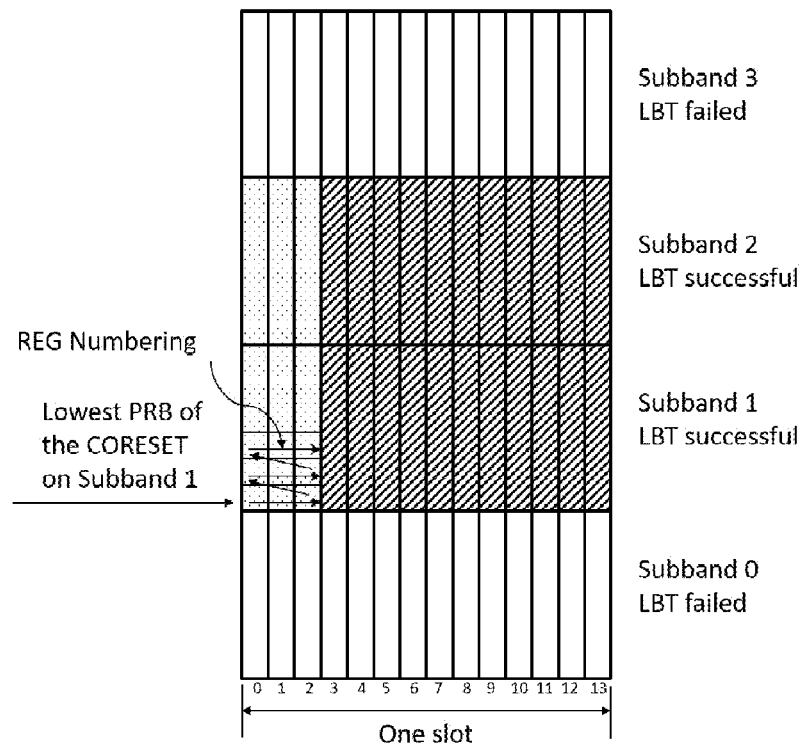
FIGS. 12(a) and (b) are schematics illustrating REG numbering according to embodiments of the invention.
Figure 12:
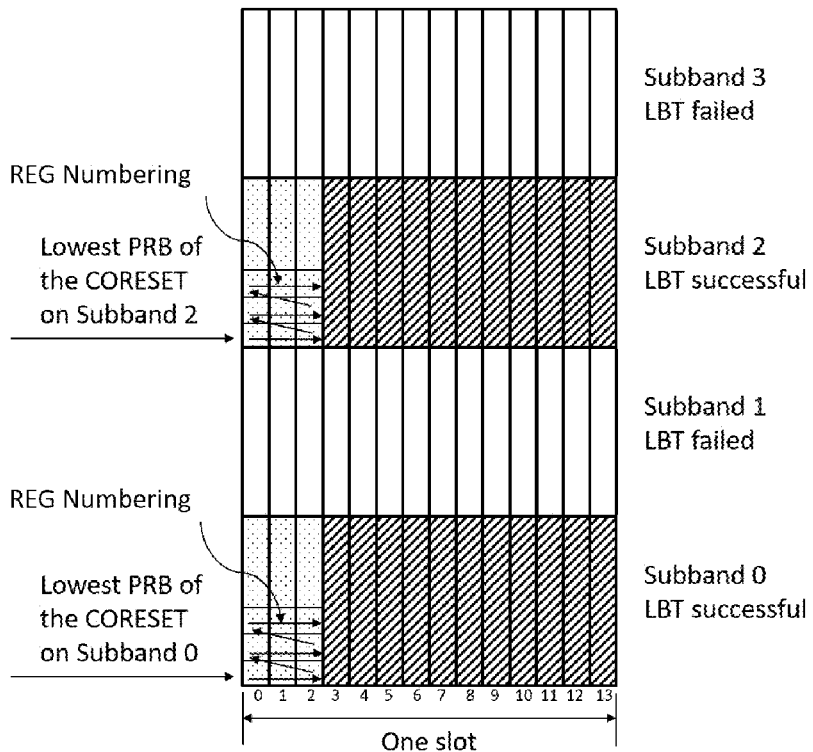

FIG. 12 (*a*) and (*b*) are schematics illustrating REG numbering according to embodiments of the invention.

Initially, a plurality of subbands for transmitting uplink data are configured for a UE by gNB via an RRC signaling. Each subband may have a bandwidth of 20 MHz. For example, as shown in FIGS. 8-12, 4 subbands ranging from 0-3 are configured for a UE. In order to obtain a COT, UE needs to perform a channel access procedure, e.g. an LBT Category 4 procedure, for each of the configured subbands before transmitting. Next, the UE initiates a COT on a set of subbands for which the LBT procedure generated a successful result and begins a configured grant-PUSCH (CG-PUSCH) transmission on the set of subbands with successful LBT procedure result. The set of subbands with successful LBT results consists of those subbands for which the LBT procedure concluded with a successful result among the plurality of configured subbands and is referred to as a LBT successful subbands set herein below. UE may transmit uplink data to the gNB on the subbands of the LBT successful subbands set in slots within the COT. UE may transmit CG-UCI associated with the uplink data in slots within the COT either on each subband of the LBT successful subbands set or only on the lowest or highest subband(s) of the LBT successful subbands set to the gNB.

The CG-UCI may include information on the result of the channel access procedure for each subband. For example, an indicator may be included in the CG-UCI to indicate the index of the occupied subbands where PUSCH with configured grant is transmitted, the index of the subband with successful LBT results, or other indication related to the subband-based LBT procedure result.

The indicator may be a bitmap, indicating the LBT procedure result for each subband, with each bit corresponding to one subband to indicate whether the LBT procedure for this subband was successful. Per the example shown in FIG. 7, the bitmaps corresponding to configurations shown in FIG. 7(*a*) and FIG. 7(*b*) may be [0011] and [0111] respectively.

Alternatively, the indicator may be an index of the predefined subband combinations. The predefined subband combinations may be contiguous subbands or any subbands with successful LBT procedure result. For the subbands configuration in FIGS. 8-11, possible contiguous subband combinations are shown in Table 1 and all possible subband combinations are shown in Table 2.

TABLE 1

Possible contiguous subband combinations

| Index | Contiguous subband combinations | Bandwidth (MHz) |
|---|---|---|
| 0 | Subband 0 | 20 |
| 1 | Subband 1 | 20 |
| 2 | Subband 2 | 20 |
| 3 | Subband 3 | 20 |
| 4 | Subband 0 and Subband 1 | 40 |
| 5 | Subband 1 and Subband 2 | 40 |
| 6 | Subband 2 and Subband 3 | 40 |
| 7 | Subband 0, Subband 1 and Subband 2 | 60 |
| 8 | Subband 1, Subband 2 and Subband 3 | 60 |
| 9 | Subband 0, Subband 1, Subband 2 and Subband 3 | 80 |

TABLE 2

Possible subband combinations

| Index | Subband combinations | Bandwidth (MHz) |
|---|---|---|
| 0 | Subband 0 | 20 |
| 1 | Subband 1 | 20 |
| 2 | Subband 2 | 20 |
| 3 | Subband 3 | 20 |
| 4 | Subband 0 and Subband 1 | 40 |
| 5 | Subband 0 and Subband 2 | 40 |
| 6 | Subband 0 and Subband 3 | 40 |
| 7 | Subband 1 and Subband 2 | 40 |
| 8 | Subband 1 and Subband 3 | 40 |
| 9 | Subband 2 and Subband 3 | 40 |
| 10 | Subband 0, Subband 1 and Subband 2 | 60 |
| 11 | Subband 0, Subband 1 and Subband 3 | 60 |
| 12 | Subband 0, Subband 2 and Subband 3 | 60 |
| 13 | Subband 1, Subband 2 and Subband 3 | 60 |
| 14 | Subband 0, Subband 1, Subband 2 and Subband 3 | 80 |

Table 1 and Table 2 may be configured to UE by gNB or specified in the standard.

Per the example shown in FIG. 7(a), the indicator may be "6" if Table 1 is used, and may be "9" if Table 2 is used. Per the example shown in FIG. 7(b), the indicator may be "8" if Table 1 is used and may be "13" if Table 2 is used.

Alternatively, the indicator may indicate an index of each subband in the LBT successful subbands set. Per the examples shown in FIG. 7, the indicator may be {2, 3} for that shown in FIG. 7(a), and may be {1, 2, 3} for that shown in FIG. 7(b).

UE may share one or more slots in the COT with gNB for gNB to transmit PDCCH data. And UE may monitor the PDCCH transmission from the gNB in one or more shared slots within the COT on the subbands of the LBT successful subbands set. As mentioned above, in order to monitor the PDCCH transmission from gNB, UE needs to be configured with CORESETs and a search spaces. There are several solutions for CORESETs configuration.

Solution 1: Multiple CORESETs may be configured by a gNB to a UE for PDCCH transmission in shared slots within a UE-initiated COT via a RRC signaling, and each CORESET is configured within a subband bandwidth (20 MHz bandwidth). The multiple CORESETs may be configured to occupy different multiple subbands. Each CORESET is configured with a specific CORESET ID.

Since CORESETs are configured for PDCCH transmission, the number of configured CORESETs is related to the operation bandwidth for downlink transmission, i.e. DL bandwidth part (BWP). On the other hand, the frequency resources for PDCCH transmission are originally used for PUSCH transmission but shared by UE with gNB for PDCCH transmission. Therefore, the number of configured CORESETs is also related to the operation bandwidth for uplink transmission, i.e. UL BWP. Since the DL BWP bandwidth may be different from the UL BWP bandwidth, there are several options to determine the number of configured CORESETs.

The number of configured CORESETs may be dependent on the bandwidth of UL BWP. As the bandwidth of UL BWP is an integer multiple of 20 MHz bandwidth, the maximum number of configured CORESETs may be set to $B_{UL}/20$, where $B_{UL}$ is the bandwidth of UL BWP in unit of MHz. In this way, the bandwidth of the multiple configured CORESETs may occupy the whole UL BWP.

Alternatively, the number of configured CORESETs may be dependent on the bandwidth of DL BWP. As the bandwidth of DL BWP is an integer multiple of 20 MHz bandwidth, the maximum number of configured CORESETs may be set to $B_{DL}/20$, where $B_{DL}$ is the bandwidth of DL BWP in unit of MHz. In this option, the bandwidth of the multiple configured CORESETs can occupy the whole DL BWP.

Alternatively, the number of configured CORESETs may be dependent on the minimum bandwidth of DL BWP and UL BWP. As the bandwidth of both DL and UL BWP are integer multiples of the 20 MHz bandwidth, the maximum number of configured CORESETs may be set to $\min(B_{DL}, B_{UL})/20$. In this way, the bandwidth of the multiple configured CORESETs can occupy the subbands where UE can share slots with gNB and CORESETs can be configured.

Figure 8:
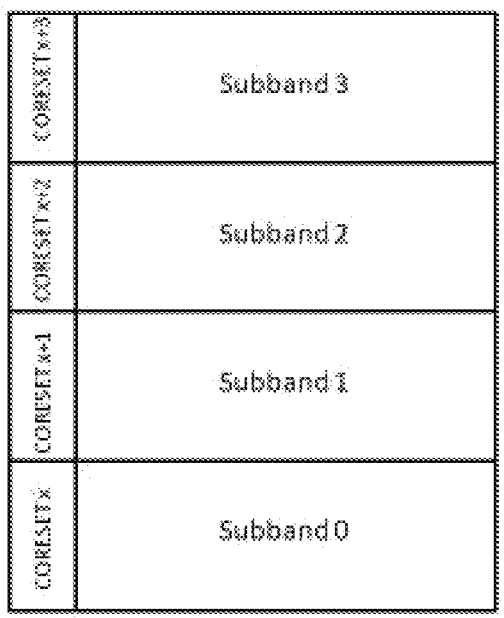
FIGS. 8-11 are schematics illustrating CORESET configuration and subbands configuration on wideband according to embodiments of the invention.

FIG. 8 shows an example of CORESET configuration for Solution 1. As shown in FIG. 8, 4 CORESETs are configured for 4 subbands, i.e. a CORESET x is configured within a subband 0, a CORESET x+1 is configured within a subband 1, a CORESET x+2 is configured within a subband 2, and a CORESET x+3 is configured within a subband 3.

In the CG-UCI, the CORESETs where the UE attempts to monitor PDCCH transmission in the shared slots are indicated to gNB. The indicated CORESETs should be the CORESETs configured on the subbands with a successful LBT procedure. To save UE PDCCH transmission blind detection effort, UE may indicate one or more CORESETs in the CG-UCI even though there are more subbands with successful LBT results configured with CORESETs. Per the example shown in FIG. 8, assuming LBT procedures for the four subbands 0-3 all generate a successful result, UE may indicate the 4 corresponding CORESETs (CORESET x-CORESET x+3) to gNB for PDCCH transmission. Instead of indicating 4 CORESETs, UE may indicate only one or two CORESETs to save UE PDCCH transmission blind detection effort.

The CORESETs indication in a CG-UCI for Solution 1 will be described.

As one or more CORESETs may be used to transmit PDCCH data to the UE, a bitmap in the CG-UCI may be used to indicate the CORESETs where the UE attempts to monitor PDCCH transmissions. Each bit in the bitmap corresponds to a CORESET ID. A bit that is set to 1 indicates that the corresponding CORESET is the CORESET where the UE attempts to monitor PDCCH transmission. Per the example shown in FIG. 8, a 4-bit bitmap is carried in the CG-UCI with the first bit corresponding to the CORESET x, the second bit corresponding to the CORESET x+1, the third bit corresponding to the CORESET x+2, and the fourth bit corresponding to the CORESET x+3. If the LBT procedure performed on the subband 0, the subband 1, and the subband 2 is successful, then the CORESET x, the CORESET x+1, and the CORESET x+2 could be indicated to gNB for PDCCH transmission. However, UE may indicate only one or two of them, for example, the CORESET x and the CORESET x+1. In this case, the bitmap may be [1100].

Alternatively, a field in the CG-UCI may be used to indicate the specific CORESETs where the UE attempts to monitor PDCCH transmission. Continuing the example described in the previous paragraph, the field in CG-UCI may be {x, x+1} to indicate the specific CORESETs among the 4 CORESETs where the UE attempts to monitor PDCCH transmission. Especially, if only one CORESET is used to transmit PDCCH to the UE, the field in the CG-UCI is used to indicate the specific CORESET where the UE attempts to monitor PDCCH transmission.

The maximum number of the required bits in the CG-UCI to indicate the CORESETs where the UE attempts to monitor PDCCH transmission in the shared COT is based on the maximum number of configured CORESETs.

The CORESET ID space of the CORESET ID may be used per BWP, for example, the number of values for the CORESET IDs may be 4 for the example shown in FIG. 8 where there are 4 subbands in a BWP. Or the CORESET ID space may be used across the BWPs of a Serving Cell. For example, if there are 4 BWPs in a Serving Cell and each BWP is the same as FIG. 8, the number of values for the CORESET IDs may be 16. Or the CORESET ID space may be used across the Serving Cells. For example, if there are 5 Serving Cells configured to the UE, and there are 4 BWPs in each Serving Cell and each BWP is the same as FIG. 8, then the total number of values for the CORESET IDs may be 80.

Solution 2: Multiple CORESETs may be configured by a gNB to a UE for PDCCH transmission in shared slots within a UE-initiated COT via a RRC signaling. Unlike Solution 1 where each CORESET is configured within a subband, in Solution 2, each CORESET is configured with an integer multiple of the subband bandwidth. For example, each CORESET may be configured with a frequency bandwidth of 20, 40, 60, 80, or 100 MHz according to the bandwidth of the BWP. The multiple CORESETs are configured to occupy different subbands and each CORESET is configured with a specific CORESET ID.

Figure 9:
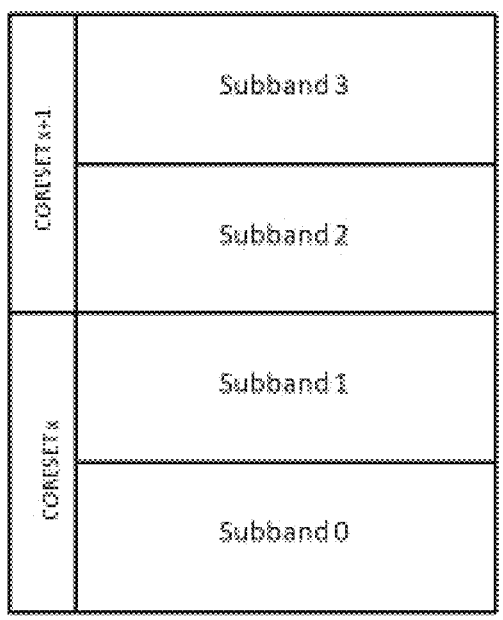

FIG. 9 shows an example of CORESETs configuration for Solution 2. As shown in FIG. 9, 2 CORESETs are configured on subbands, i.e., CORESET x is configured on subband 0 and subband 1, and CORESET x+1 is configured on subband 2 and subband 3. Other configurations are possible. For example, one CORESET is configured on subbands 0-2, subbands 1-3, and so on.

The CORESETs indication in a CG-UCI for Solution 2 will be described.

A field in the CG-UCI may be used to indicate a specific CORESET where the UE attempts to monitor PDCCH transmission. UE may indicate one CORESET where the UE attempts to monitor PDCCH transmission. The indicated CORESET has the largest contiguous frequency bandwidth on the contiguous subbands of the LBT successful subbands set. The largest contiguous frequency bandwidth is selected from a set of predefined contiguous subband combinations. The potential number of CORESETs is dependent on the number of combinations of contiguous subbands. Per the example shown in FIG. 9, since there are 4 subbands, i.e., subbands 0-3, there are 10 contiguous subband combinations as shown in Table 1. If the LBT procedure performed on subbands 0-3 is successful, the CORESET with a largest contiguous frequency bandwidth on the contiguous subbands of the LBT successful subbands set is the CORESET x. The field in CG-UCI is "4" to indicated that the CORESET x is configured on subband 0 and subband 1, where the UE attempts to monitor PDCCH transmission. It requires 4 bits to indicate a specific CORESET according to Table 1. To reduce the number of required bits, up to 8 contiguous subband combinations among the 10 combinations may be defined in Table 1 so that a maximum of 8 CORESETs may be indicated. In this case, only three bits are needed in CG-UCI to indicate a specific CORESET where the UE attempts to monitor PDCCH transmission.

Alternatively, a field in the CG-UCI may be used to indicate a specific CORESET where the UE attempts to monitor PDCCH transmission. The number of CORESETs required to be indicated is dependent on the number of possible contiguous bandwidths. Per the example shown in FIG. 9, there are 4 possible bandwidth values after performing LBT on each subband, i.e., 20, 40, 60 or 80 MHz. Therefore, 4 possible CORESETs that may be configured for each bandwidth, that is, CORESETs span one subband, two subbands, three subbands, and four subbands. Then the field in CG-UCI requires 2 bits to indicate a specific CORESET. For example, "00" indicates a CORESET within one subband, "01" indicates a CORESET across two subbands, "10" indicates a CORESET across three subbands, and "11" indicates a CORESET across four subbands. For the example shown in FIG. 9, the field is "01" to indicate a CORESET across two subbands. The span of the specific CORESET may be indicated with the field in the CG-UCI, while the frequency position of the CORESET is variable dependent on the LBT successful subbands set. For example, the frequency position may be defined with reference to the lowest physical resource block (PRB) of the largest contiguous frequency bandwidth on the contiguous subbands in the LBT successful subbands set.

Solution 3: Only one CORESET may be configured by a gNB to a UE for PDCCH transmission in shared slots within a UE-initiated COT via a RRC signaling. The CORESET is configured within a subband bandwidth (within 20 MHz bandwidth) and configured with a specific CORESET ID.

Figure 10:
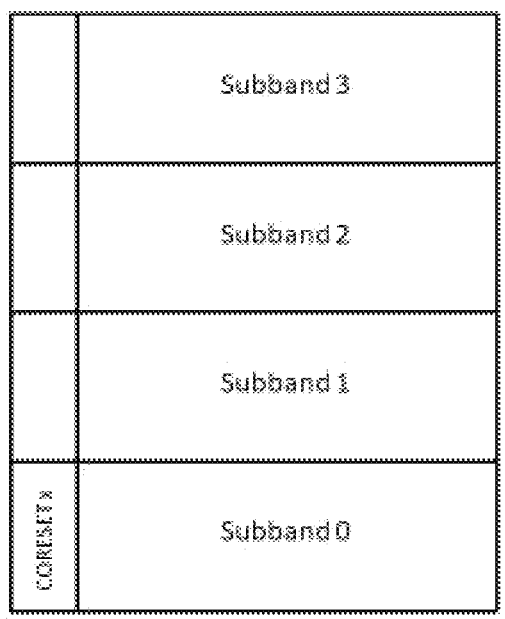

FIG. 10 shows an example of CORESET configuration for Solution 3. As shown in FIG. 10, only one CORESET, CORESETx, is configured within a subband bandwidth.

For Solution 3, in the CG-UCI, the indexes of subbands where the UE attempts to monitor a PDCCH transmission in the shared slots may be indicated to gNB. The indicated subbands should be a subset of the LBT successful subbands set, referred to as a monitoring subbands set herein below. To reduce the difficulty for UE PDCCH transmission blind detection, UE may indicate one or more subbands in CG-UCI even though there are more subbands with successful LBT procedure. Per the example shown in FIG. 10, if the LBT procedure generates a successful result (i.e. LBT is successful) on subbands 0-2, UE may only indicate subbands 0-1 to the gNB for PDCCH transmission. The UE will monitor the downlink control channel transmission on the subbands of the monitoring subbands set in the shared slots.

The subbands indication in a CG-UCI for Solution 3 will be described.

A bitmap in the CG-UCI may be used to indicate one or more subbands where the UE attempts to monitor PDCCH transmission. Each bit of the bitmap corresponds to one subband of the LBT successful subbands set. The bit with value "1" indicates the UE will attempt to monitor a PDCCH transmission on the corresponding subband within the shared slots. Per the example shown in FIG. 10, if LBT procedure is successful on all 4 subbands, 4-bit bitmap may be carried in the CG-UCI with the first bit corresponding to subband 0, the second bit corresponding to subband 1, the third bit corresponding to subband 2, and the fourth bit corresponding to subband 3. If the UE identifies the subband 0 to the gNB where the UE will attempt to monitor PDCCH transmission, the bitmap may look like [1000].

Alternatively, a field in the CG-UCI may be used to indicate the indexes of each subband of the monitored subbands set. Continuing the example described in the previous paragraph, the field in the CG-UCI requires 2 bits with "00" corresponding to subband 0, "01" corresponding to subband 1, "10" corresponding to subband 2, and "11" corresponding to subband 3. In this example, the field is set to be {00} to indicate the first subband.

For Solution 3, one CORESET is configured within a subband bandwidth while the frequency position of the CORESET varies dependent on the LBT procedure result. The frequency position may be defined on each subband of the monitoring subbands set. UE indicates the LBT procedure result of each subband with CG-UCI, as described in Solution 1. Furthermore, in the CG-UCI, UE further indicates one of the subbands in the monitoring set of subbands to gNB as the frequency position of the CORESET. Or the frequency position of the CORESET may be defined with reference to the lowest PRB of the subbands of the monitoring subbands set.

Solution 4: Only one CORESET may be configured by a gNB to a UE for PDCCH transmission in shared slots within a UE-initiated COT via a RRC signaling. The CORESET may be configured with a frequency band span up to the whole BWP bandwidth.

Figure 11:
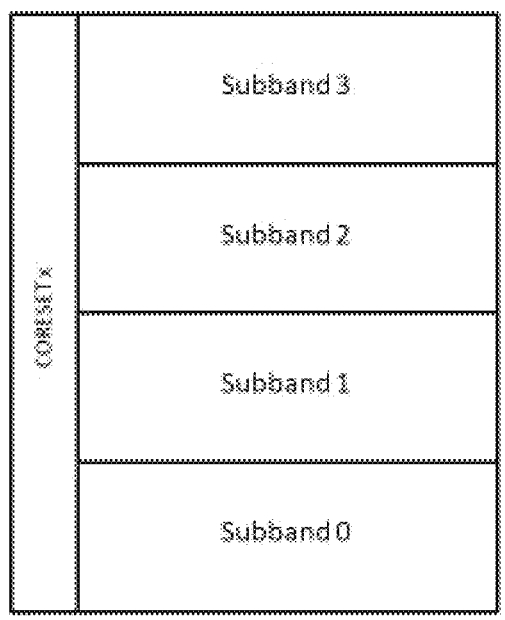

FIG. 11 shows an example of a CORESET configuration associated with Solution 4. As shown in FIG. 11, only a single CORESET x is configured across the entire BWP bandwidth from subband 0 to subband 3.

In the CG-UCI, UE may indicate the indexes of the occupied LBT procedure subbands, i.e. the index of the subband with successful LBT results, or the subband-based LBT result, to gNB. Therefore, besides the subband(s) where the PUSCH data is transmitted by the UE, the CG-UCI further indicates subbands on which the UE would monitor PDCCH transmission. Upon reception of the CG-UCI, the gNB may transmit PDCCH data in the shared slot(s) within the UE-initiated COT on the indicated subband(s) with successful LBT results.

In Solution 4, regarding the subbands indication, a bitmap in the CG-UCI is used to indicate the LBT result of each subband. Each bit in the bitmap corresponding to a subband index. Alternatively, a field in the CG-UCI is used to indicate the contiguous subband combinations with successful LBT results. One example is shown in Table 1, where a BWP for the UE is 80 MHz and 4 subbands are defined. Consequently, 10 contiguous subband combinations can be defined and 4 bits are required for the field in CG-UCI to indicate one of the contiguous subband combinations. Alternatively, a field in CG-UCI is used to indicate the possible subband combinations with successful LBT results. One example is shown in Table 2, in this case, the given BWP for the UE is 80 MHz, and 4 subbands are defined. Consequently, 15 subband combinations can be defined for contiguous and non-contiguous bandwidth occupation and 4 bits are required for the field in CG-UCI to indicate one of the subband combinations.

Solution 5: A default CORESET is predefined for PDCCH transmission in the shared slots within a UE-initiated COT when a gNB configures a configured grant PUSCH transmission to a UE via a RRC signaling. The duration of the CORESET may be set to 1, 2 or 3 OFDM symbols in the time domain. The frequency bandwidth of the CORESET may be confined within a 20 MHz bandwidth. Non-interleaved CCE-to-REG mapping or interleaved CCE-to-REG mapping within the 20 MHz bandwidth is predefined. The same beamforming precoder may be used within a REG bundle which is made of multiple REGs.

The frequency position of the CORESET may be preconfigured in the RRC signaling for configuring the configured grant PUSCH transmission.

Alternatively, the frequency position of the CORESET may be located on one or more subbands of the LBT successful subbands set. For example, the frequency position of the CORESET may the lowest subband with successful LBT result. This subband may be implicitly derived by the gNB based on a detected PUSCH transmission or explicitly indicated to the gNB with an indicator in the CG-UCI.

Since the bandwidth of the CORESET is confined within a subband bandwidth (20 MHz bandwidth), as long as the LBT procedure is successful for at least one subband, the CORESET can be used for PDCCH transmission. The frequency position of the CORESET may be variable from one UE-initiated COT to another UE-initiated COT. In the shared slots, UE may monitor PDCCH transmission only in the lowest subband with successful LBT results. Alternatively, UE may monitor PDCCH transmission from the lowest subband to the highest subband within the LBT successful subbands set until one PDCCH is detected.

Five solutions for CORESET configuration have been described above. Further features of the present invention will be described below.

REs in CORESET are organized in REGs. REGs within a CORESET are numbered in increasing order in a time-first manner, starting with 0 for the first OFDM symbol and the lowest-numbered RB in the CORESET. For the CORESET configuration in Solutions 1-5, REGs in CORESETs may be numbered within each CORESET of the configured multiple CORESETS or within the one configured CORESET. For the CORESET configuration in Solution 4 where one CORESET is configured across the entire bandwidth, the REG numbering within the indicated subbands will be described with reference to FIG. 12.

FIGS. 12(a) and (b) are schematics illustrating REG numbering according to embodiments of the invention.

Only contiguous subbands with successful LBT procedure are counted for REG numbering. In the indicated subbands with the successful LBT procedure, the REG numbering starts from the lowest PRB of the CORESET on the lowest subband, in time first-frequency second manner. Per the example shown in FIG. 12 (a), 4 subbands i.e. subbands 0-3 are configured. The LBT procedure is successful on subband 1 and subband 2 while failed on subband 0 and subband 3. Contiguous subbands with successful LBT procedure results are subbands 1 and 2 in this case. REGs in CORESET are numbered within subband 1 and subband 2, and are located within the first 3 OFDM symbols of one slot. The REG number starts from the lowest PRB of the CORESET on subband 1 and from the first symbol in the CORESET in time first-frequency second manner.

Alternatively, REG numbering is done on the subbands with successful LBT procedure results. In the indicated subbands with successful LBT procedure results, the REG numbering starts from the lowest PRB of the CORESET on the lowest subband, in time first-frequency second manner. For the subbands with LBT failure, the REG numbering skips to the next subband until the last subband. Or the REG numbering is continued on the subbands with failed LBT procedure results but the numbers in the subbands with failed LBT procedure results will not be used. Per the example shown in FIG. 12 (b), 4 subbands are configured, i.e. subbands 0-3. LBT procedure is successful on subband 0 and subband 2 while failed on subband 1 and subband 3. REGs in CORESET are numbered within subband 0 and subband 1 and within the first 3 OFDM symbols in one slot. The REG number in the CORESET starts from the lowest PRB of the CORESET on subband 0 and from the first symbol in a slot and increased in time first-frequency second manner. The subband 1 may be skipped for REG numbering. Then the REG number continues from the lowest PRB of the CORESET on subband 2 and from the first symbol in the CORESET in time first-frequency second manner. Alternatively, REG numbering continues in subbands 0-2, but the numbers in subband 1 will not be used since LBT procedure is failed on the subband. The REG numbering is end at subbands 2 since no further subband with successful LBT result is exist.

Alternatively, all the subbands are counted for REG numbering. In this case, the REGs in the CORESET may be numbered across all of the plurality of configured subbands. Per the example shown in FIG. 12(a), the REGs in the CORESET are numbered from subband 0 to subband 3 within the first 3 OFDM symbols in time first-frequency second manner.

As mentioned before, the gNB may need to perform a short LBT procedure before the PDCCH transmission in the shared slots within the UE-initiated COT. When the short LBT procedure at the gNB fails on subband(s) where the UE indicated CORESET(s) is configured, UE may not receive the expected PDCCH transmission. In this case, UE may operate with the following options.

Option 1: UE only monitors PDCCH transmissions within the CORESET(s) indicated by CG-UCI in the shared slots. If UE does not detect a PDCCH transmission in the indicated CORESET(s) in the first shared slot or the first PDCCH monitoring occasion based on the search space configuration, the UE shall continue to detect a PDCCH transmission in the indicated CORESET(s) in the next shared slot or the next PDCCH monitoring occasion. In this option, the gNB only transmits PDCCH data in the UE-indicated CORESET(s). So the monitoring effort at the UE side may be same from the first shared slot to later shared slots, or from the first PDCCH monitoring occasion to later PDCCH monitoring occasions.

Per the example shown in FIG. 8, it is assumed that LBT procedure is successful on subband 0 and subband 1, with CORESET x indicated to gNB for PDCCH transmission. In this case, the UE monitors PDCCH transmission from the gNB in CORESET x in the first shared slot or the first PDCCH monitoring occasion within the COT. If UE does not detect any PDCCH transmission in CORESET x in the first shared slot or the first PDCCH monitoring occasion within the COT, the UE will monitor PDCCH transmission from the gNB in CORESET x in the next shared slot or the next PDCCH monitoring occasion within the COT.

Option 2: UE monitors PDCCH transmissions in the shared slots in the CORESET(s) indicated by the CG-UCI. If UE does not detect a PDCCH transmission in the indicated CORESET(s) in the first shared slot or the first PDCCH monitoring occasion based on the search space configuration, the UE shall continue to detect a PDCCH transmission in other CORESET(s) beyond those UE-indicated CORESET(s) in the first shared slot or the first PDCCH monitoring occasion. Or the UE shall continue to detect a PDCCH transmission in the UE-indicated CORESET(s) and other configured CORESETs from the next shared slot or the next PDCCH monitoring occasion. In this option, if the short LBT procedure at gNB has failed on the subbands indicated by UE, the gNB may try to perform another short LBT procedure at the start of the next shared slot or next PDCCH monitoring occasion, and then use other subband(s) or CORESET(s) beyond those indicated by the UE in the CG-UCI. Here, the other CORESET(s) beyond those UE-indicated CORESET(s) should be the CORESET(s) configured on the subband(s) with successful LBT results or on the subband(s) occupied by UE for PUSCH transmission, as indicated in the CG-UCI. Similarly, the other subband(s) beyond those UE-indicated subband(s) means the subband(s) beyond the monitoring subbands but in the LBT successful subbands set. In this option, gNB attempts to transmit a PDCCH transmission first in the CORESET(s) or subband(s) indicated by UE for PDCCH monitoring. If LBT procedure for the subband(s) where the UE-indicated CORESET(s) are configured or LBT procedure for the subband(s) where the UE attempts to monitor PDCCH transmission are failed, the gNB may attempt to transmit PDCCH data in other CORESET(s) or other subband(s) beyond those indicated by the UE in the CG-UCI. In this case, the monitoring effort at the UE side may be different from the first shared slot to later shared slots, or from the first PDCCH monitoring occasion to later PDCCH monitoring occasions.

Per the example shown in FIG. 8, it is assumed that the LBT procedure is successful on subband 0 and subband 1, with a CORESET x being identified to the gNB for PDCCH transmission. In this case, the UE monitors PDCCH transmission from the gNB in CORESET x in the first shared slot or the first PDCCH monitoring occasion within the COT. If the UE does not detect any PDCCH transmission in CORESET x in the first shared slot or the first PDCCH monitoring occasion within the COT, the UE will monitor PDCCH transmission from the gNB in CORESET x+1 in the first shared slot or the first PDCCH monitoring occasion within the COT.

Per the example shown in FIG. 10, the UE indicates the LBT successful subbands set including subband 0 and subband 1 to the gNB, and indicates the monitoring subbands set including subband 0 to gNB. If UE does not detect any PDCCH transmission in subband 0 in the first shared slot or the first PDCCH monitoring occasion within the COT, the UE will monitor PDCCH transmission from the gNB in subband 1 in the first shared slot or the first PDCCH monitoring occasion within the COT.

The search spaces configuration for a UE to monitor PDCCH transmission in the UE shared COT will be described below.

The CG-UCI may further include an indicator indicating one or more slots where the UE attempts to monitor PDCCH transmission from the gNB. The one or more indicated slots are within the COT and shared with the gNB for PDCCH transmission. UE may monitor the PDCCH transmission in the indicated one or more slots. In order to indicate the one or more slots, the indicator may indicate a monitoring slot periodicity and a slot level offset for the gNB to determine the one or more slots. The gNB may determine the one or more monitoring slots according to the received monitoring slot periodicity and the slot level offset with reference to a reference slot. The reference slot may be the first slot shared with the gNB for downlink transmission.

According to one embodiment, only CG-DFI is allowed to be transmitted in PDCCH by the gNB in the shared slots within a UE-initiated COT. The gNB configures a search space for CG-DFI monitoring. The IE of monitoringSlotPeriodicityAndOffset for search space configuration is reserved in the CG-DFI. Here, the IE of monitoringSlotPeriodicityAndOffset indicates the monitoring slot periodicity and offset in those slots where the UE is required to monitor PDCCH transmission. In order to monitor PDCCH transmission within the shared slots, UE may indicate the field of monitoringSlotPeriodicityAndOffset in the CG-UCI. Upon reception of this field in CG-UCI from the UE, the gNB may derive one or more shared slots where UE attempts to monitor PDCCH transmission based on the monitoring periodicity and offset with reference to a reference slot. The first slot of the shared slots may be used as the reference slot. gNB may transmit CG-DFI on PDCCH in the derived slots.

According to another embodiment, multiple PDCCH transmissions including CG-DFI, DL grant, and UL grant for the UE are allowed to be transmitted in the shared slots within a UE-initiated COT. In this case, gNB configures multiple search spaces for multiple PDCCH transmissions monitoring. The IE of monitoringSlotPeriodicityAndOffset for each search space is reserved in each CG-DFI. In order to monitor PDCCH transmission within the shared slots, UE may indicate the field of monitoringSlotPeriodicityAndOffset in CG-UCI. Similar to the previous embodiment, gNB may derive one or more shared slots where UE attempts to monitor the multiple PDCCH transmissions based on the monitoring periodicity and offset with reference to a reference slot. And gNB may transmit multiple PDCCH transmissions carrying CG-DFI, DL grant and UL grant in the derived slots.

According to a further embodiment, a default search space is predefined for PDCCH transmission in the shared slots within the UE-initiated COT when gNB configures configured grant PUSCH transmission to the UE via a RRC signaling. The aggregation level and associated number of PDCCH candidates are predefined for PDCCH monitoring within the shared slots. Therefore, the field of monitoringSlotPeriodicityAndOffset is not needed in the CG-UCI.

Some application occasions for UE sharing COT are described below.

In the broadcast synchronization signal block (SSB)/system information block (SIB)1 occasions, the UE should share the slots configured for the gNB to transmit SSB/SIB1.

If the UE determines there are overlapped resources between the UE-initiated COT and potential SSB transmission in the time domain and frequency domain, the UE should share the overlapped slots with the gNB for the potential SSB transmission.

In the configured monitoring occasions for group common PUCCH (GC-PUCCH, which is a channel carrying information intended for a group of UEs), the UE should share the slots configured for the gNB to transmit GC-PDCCH transmission.

If the UE determines there are overlapped resources between the UE-initiated COT and configured GC-PDCCH transmission occasions in the time domain and frequency domain, the UE should share the overlapped resources with the gNB for GC-PDCCH transmission.

If there are search spaces configured within the UE-initiated COT and associated CORESETs configured on one or more successful LBT subbands, the UE may share the slots where search spaces are configured and monitor PDCCH transmission within the configured CORESETs and configured search spaces.

If there is no search space configured within the UE-initiated COT or associated CORESET configured on the one or more failed LBT procedure subbands, the UE does not share the slots where search space is not configured and does not detect the PDCCH transmission.

The occasions related to whether UE should monitor PDCCH transmission in the shared slots within the UE-initiated COT are described below.

If the UE shares some time resources (e.g., several consecutive OFDM symbols in one slot, one or more slots, etc.) with the gNB, and there are search spaces configured within the shared time resources and associated CORESETs configured on the one or more successful LBT subbands, the UE may detect PDCCH transmission within the configured CORESETs and configured search spaces.

If the UE shares some time resources (e.g., several consecutive OFDM symbols in one slot, one or more slots, etc.) with the gNB, and there is no search space configured within the shared time resources or associated CORESETs configured on the one or more subbands with successful LBT results, the UE may not detect PDCCH transmission.

If the UE does not share any time resources (e.g., several consecutive OFDM symbols in one slot, one or more slots, etc.) with gNB, and there are search spaces configured within the time resources and associated CORESETs configured on one or more successful LBT subbands, the UE may not detect PDCCH transmission within the configured CORESETs and configured search spaces.

Figure 13:
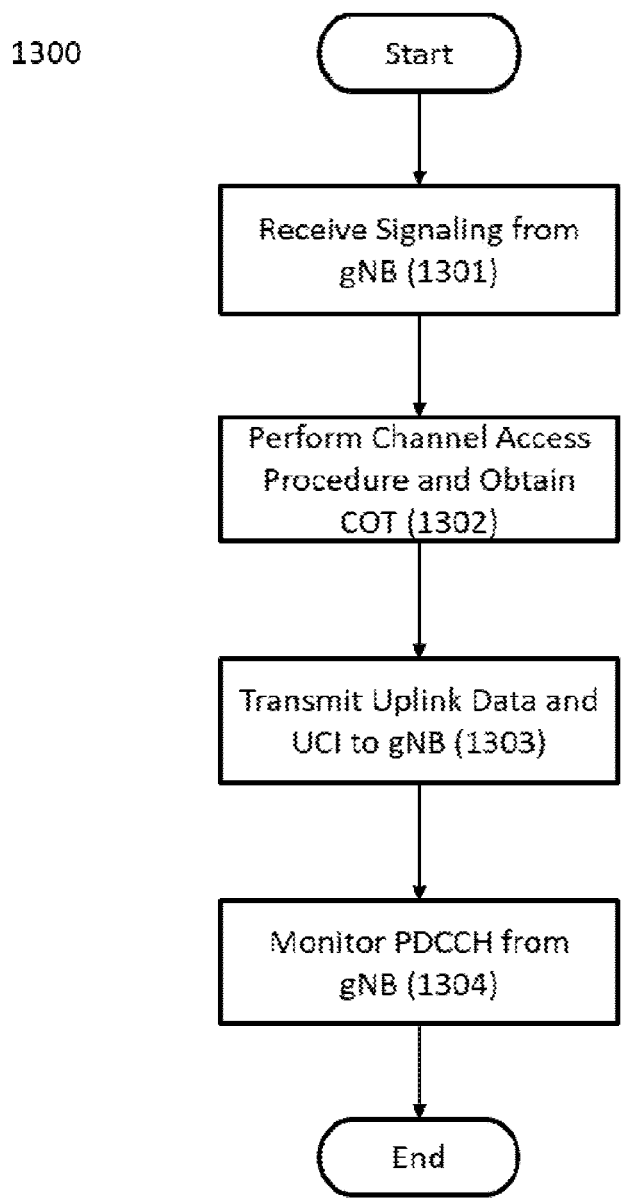
FIG. 13 is a flow chart illustrating a procedure performed at a UE for PDCCH monitoring in UE-initiated COT according to the embodiments of the invention.

FIG. 13 is a flow chart illustrating a procedure performed at a UE for transmission in UE-initiated COT according to the embodiments of the invention.

Procedure 1300 illustrates a method performed by a UE to transmit uplink data to a gNB in UE-initiated COT and receive downlink data from the gNB in shared slots of the UE-initiated COT.

At step 1301, the UE receives signalings from the gNB to configure a plurality of subbands for transmitting uplink data. In addition, one or more CORESETs are configured for the UE to monitor PDCCH transmitted from the gNB.

At step 1302, in order to obtain a COT, the UE performs channel access procedure on each of the plurality of subbands configured in the signalings. For example, the UE may perform an LBT Category 4 or Type 1 channel access procedure. The one or more subbands with a successful LBT procedure result(s) may be grouped into an LBT successful subbands set. The UE obtains the COT on the LBT successful subbands set.

At step 1303, the UE transmits uplink data and uplink control information, e.g. CG-UCI, to the gNB on the subbands within the LBT successful subbands set. The CG-UCI may include indicators indicating the LBT result, the CORESETs to be monitored, the subbands to be monitored, and so on. The indication for CORESETs and subbands in the CG-UCI have been described above.

At step 1304, the UE monitors PDCCH transmission from the gNB in the indicated CORESETs or subbands. If the UE does not receive PDCCH data in the indicated CORESETs or subbands, the UE may continue to monitor the PDCCH transmission in the indicated CORESETs or subbands. Or the UE may monitor the PDCCH transmission in other CORESETs beyond the indicated CORESETs or other subbands beyond the indicated subbands, as described above.

Figure 14:
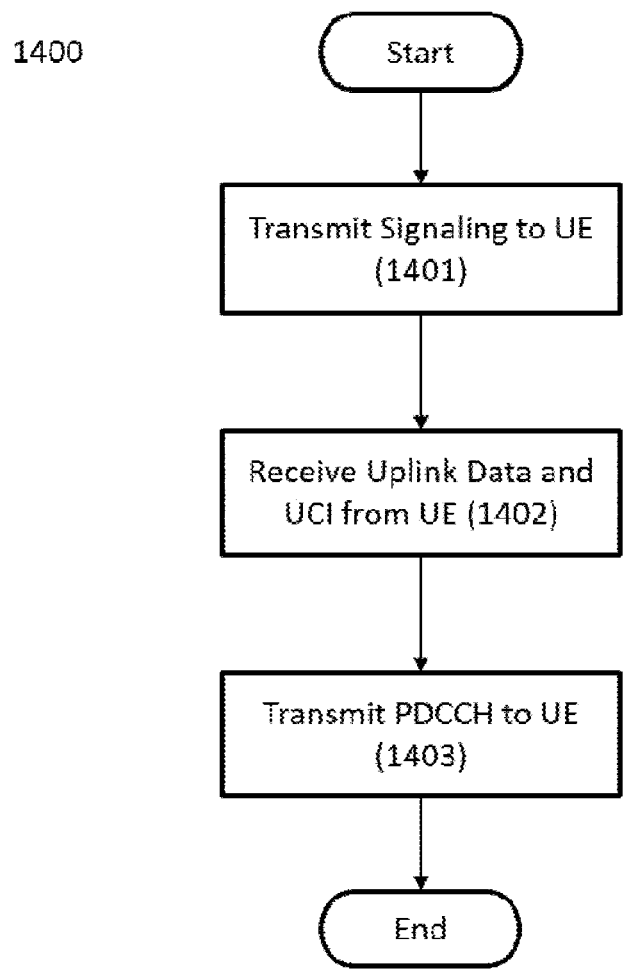
FIG. 14 is a flow chart illustrating a procedure performed at a gNB for PDCCH transmission in UE-initiated COT according to the embodiments of the invention.

FIG. 14 is a flow chart illustrating a procedure performed at a gNB for transmission in UE-initiated COT according to the embodiments of the invention.

Procedure 1400 illustrates a procedure for a gNB to receive uplink data from a UE in UE-initiated COT and transmit downlink data to the UE in shared slots within the UE-initiated COT.

At step 1401, the gNB transmits signalings to the UE. A plurality of subbands for transmitting uplink data are configured in the signalings. In addition, one or more CORESETs are configured for the UE to monitor PDCCH transmission from the gNB.

At step 1402, the gNB receives uplink data and uplink control information, e.g. CG-UCI, from the UE on one or more subbands of the LBT successful subbands set. As described above, the CG-UCI may include indicators indicating the LBT result, the CORESETs to be monitored, the subbands to be monitored, and the like. The indication for CORESETs and subbands in the CG-UCI have been described above.

At step 1403, the gNB transmits PDCCH data to the UE in the indicated CORESET(s). If the gNB cannot transmit PDCCH data in the indicated CORESET(s) or subbands in the first monitoring occasion of the shared slots, the gNB may continue to transmit the PDCCH data in the indicated CORESETs or subbands in the next monitoring occasion of the shared slots. Or the gNB may transmit the PDCCH data in other CORESETs beyond the indicated CORESETs or other subbands beyond the indicated subbands, as described above.

It should be noted that the steps described above are not all necessary. It is possible to perform only some of these steps. The order of steps is also not mandatory but may be performed in other orders or in parallel. The execution of some steps requires signaling. The collective signaling described in the specification as being used for multiple steps may be replaced with separate signaling for individual step.

In the embodiments described above, the components and the features of the embodiments are combined in a predetermined form. Each component or feature should be considered as an option unless otherwise expressly stated. Each component or feature may be implemented independently of other components or features. Further, the embodiment may be configured by associating some components and/or features. The order of the operations described in the embodiments may be changed. Some components or features of any embodiment may be included in another embodiment or replaced with the component and the feature corresponding to that of another embodiment. It is apparent that the claims that are not expressly cited in the claims section are combined to form an embodiment or be included in a new claim.

The embodiments may be implemented by hardware, firmware, software, or combinations thereof. In the case of implementation by hardware, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and so on.

Embodiments may be practiced in other specific forms. The described embodiments are to be considered in all respects as illustrative and not restrictive. The scope of the invention is consequently indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a signaling for configuring a plurality of subbands for transmitting uplink data;
   performing a channel access procedure on respective subbands of the plurality of subbands to obtain a UE-initiated channel occupancy time (COT) on a set of subbands of the plurality of subbands, wherein the respective subbands in the set of subbands are associated with successful channel access procedures;
   transmitting the uplink data on the set of subbands within the UE-initiated COT;
   transmitting uplink control information (UCI) that indicates the set of subbands;
   monitoring one or more slots for a downlink control channel transmission, wherein the one or more slots are within the UE-initiated COT and shared for the downlink control channel transmission;
   monitoring, based at least in part on failing to receive the downlink control channel transmission during the one or more slots, the downlink control channel transmission in a subsequent monitoring occasion associated with the one or more slots; and
   receiving, within the UE-initiated COT, the downlink control channel transmission on one or more subbands of the set of subbands.

2. The method of claim 1, wherein the signaling is first signaling, and wherein receiving the downlink control channel transmission comprises:
   receiving second signaling for configuring multiple control resource sets for the UE to monitor for the downlink control channel transmission, wherein the UCI indicates one or more control resource sets of the multiple control resource sets, and wherein the one or more control resource sets are associated with the one or more slots; and
   monitoring for the downlink control channel transmission within the one or more control resource sets in the one or more slots.

3. The method of claim 1, wherein the signaling is first signaling, wherein the set of subbands is a first set of subbands, and wherein receiving the downlink control channel transmission comprises:
   receiving second signaling for configuring a control resource set for the UE to monitor for the downlink control channel transmission, wherein the UCI indicates a second set of subbands associated with monitoring for the downlink control channel transmission, and wherein the second set of subbands is within the control resource set and associated with the one or more slots; and
   monitoring for the downlink control channel transmission on the second set of subbands and in the one or more slots.

4. The method of claim 1, wherein the signaling configures a control resource set for the UE to monitor for the downlink control channel transmission in the one or more slots.

5. A user equipment (UE) for wireless communication, comprising:
   at least one memory; and
   at least one processor coupled with the at least one memory and configured to cause the UE to:
      receive a signaling for configuring a plurality of subbands for transmitting uplink data;
      perform a channel access procedure on respective subbands of the plurality of subbands to obtain a UE-initiated channel occupancy time (COT) on a set of subbands of the plurality of subbands, wherein the respective subbands in the set of subbands are associated with successful channel access procedures;

transmit the uplink data on the set of subbands within the UE-initiated COT;
transmit uplink control information (UCI) that indicates the set of subbands;
monitor one or more slots for a downlink control channel transmission, wherein the one or more slots are within the UE-initiated COT and shared for the downlink control channel transmission;
monitor, based at least in part on failing to receive the downlink control channel transmission during the one or more slots, the downlink control channel transmission in a subsequent monitoring occasion associated with the one or more slots; and
receive, within the UE-initiated COT, the downlink control channel transmission on one or more subbands of the set of subbands.

6. The UE of claim 5, wherein the UCI comprises a bitmap, and wherein respective bits of the bitmap corresponds to the respective subbands of the plurality of subbands and indicate whether the channel access procedure for the respective subbands is successful or not.

7. The UE of claim 5, wherein the UCI indicates a subband combination from a set of predefined subband combinations.

8. The UE of claim 5, wherein the UCI indicates an index of each subband of the set of subbands.

9. The UE of claim 5, wherein to receive the downlink control channel transmission, the at least one processor is configured to cause the UE to monitor for the downlink control channel transmission within a control resource set, and wherein one or more resource element groups (REGs) in the control resource set are numbered across the respective subbands of the plurality of subbands.

10. The UE of claim 5, wherein to receive the downlink control channel transmission, the at least one processor is configured to cause the UE to monitor for the downlink control channel transmission within a control resource set, and wherein one or more resource element groups (REGs) in the control resource set are numbered across one or more contiguous subbands of the set of subbands.

11. The UE of claim 5, wherein to receive the downlink control channel transmission, the at least one processor is configured to cause the UE to monitor for the downlink control channel transmission within a control resource set, and wherein one or more resource element groups (REGs) in the control resource set are numbered across one or more respective subbands of the set of subbands.

12. The UE of claim 5, wherein the signaling is first signaling, and wherein to receive the downlink control channel transmission, the at least one processor is configured to cause the UE to:
receive second signaling for configuring multiple control resource sets for the UE to monitor for the downlink control channel transmission, wherein the UCI indicates one or more control resource sets of the multiple control resource sets, and wherein the one or more control resource sets are associated with the one or more slots; and
monitor for the downlink control channel transmission within the one or more control resource sets in the one or more slots.

13. The UE of claim 5, wherein the signaling is first signaling, wherein the set of subbands is a first set of subbands, and wherein to receive the downlink control channel transmission, the at least one processor is configured to cause the UE to:
receive second signaling for configuring a control resource set for the UE to monitor for the downlink control channel transmission, wherein the UCI indicates a second set of subbands associated with monitoring for the downlink control channel transmission, and wherein the second set of subbands is within the control resource set and associated with the one or more slots; and
monitor for the downlink control channel transmission on the second set of subbands and in the one or more slots.

14. The UE of claim 5, wherein the signaling configures a control resource set for the UE to monitor for the downlink control channel transmission in the one or more slots.

15. The UE of claim 5, wherein the UCI indicates the one or more slots associated with monitoring for the downlink control channel transmission.

16. The UE of claim 5, wherein the UCI is transmitted on the respective subbands of the set of subbands.

17. A network equipment (NE) for wireless communication, comprising:
at least one memory; and
at least one processor coupled with the at least one memory and configured to cause the NE to:
receive uplink data on a set of subbands of a plurality of subbands, wherein respective subbands of the plurality of subbands are associated with successful channel access procedures, and wherein the set of subbands are associated with a UE-initiated channel occupancy time (COT);
receive uplink control information (UCI) that indicates the set of subbands; and
transmit, within the UE-initiated COT, a downlink control channel transmission on one or more subbands of the set of subbands and in one or more monitoring occasion associated with one or more slots for the downlink control channel transmission, wherein the one or more slots are within the UE-initiated COT and shared for the downlink control channel transmission.

18. The NE of claim 17, wherein the UCI comprises a bitmap, and wherein respective bits of the bitmap corresponds to the respective subbands of the plurality of subbands and indicate whether a channel access procedure for the respective subbands is successful or not.

19. The NE of claim 17, wherein the UCI indicates a subband combination from a set of predefined subband combinations.

20. A method performed by a network equipment (NE), comprising:
receiving uplink data on a set of subbands of a plurality of subbands, wherein respective subbands of the plurality of subbands are associated with successful channel access procedures, and wherein the set of subbands are associated with a UE-initiated channel occupancy time (COT);
receiving uplink control information (UCI) that indicates the set of subbands; and
transmitting, within the UE-initiated COT, a downlink control channel transmission on one or more subbands of the set of subbands and in one or more monitoring occasion associated with one or more slots for the downlink control channel transmission, wherein the one or more slots are within the UE-initiated COT and shared for the downlink control channel transmission.

* * * * *